(12) United States Patent
Serghine et al.

(10) Patent No.: US 12,404,782 B2
(45) Date of Patent: Sep. 2, 2025

(54) METHOD FOR STARTING AN AIRCRAFT ENGINE

(71) Applicant: SAFRAN HELICOPTER ENGINES, Bordes (FR)

(72) Inventors: Camel Serghine, Moissy Cramayel (FR); Olivier Robert, Moissy Cramayel (FR); Thomas Klonowski, Moissy Cramayel (FR); Caroline Maud Léna Seve, Moissy Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/004,577

(22) PCT Filed: Jul. 6, 2021

(86) PCT No.: PCT/FR2021/051241
§ 371 (c)(1),
(2) Date: Jan. 6, 2023

(87) PCT Pub. No.: WO2022/008834
PCT Pub. Date: Jan. 13, 2022

(65) Prior Publication Data
US 2023/0243467 A1    Aug. 3, 2023

(30) Foreign Application Priority Data
Jul. 9, 2020    (FR) ...................................... 2007261

(51) Int. Cl.
*F01D 25/20*    (2006.01)
*F01D 19/00*    (2006.01)
(Continued)

(52) U.S. Cl.
CPC .............. *F01D 25/20* (2013.01); *F01D 19/00* (2013.01); *F01D 25/10* (2013.01); *F01D 25/18* (2013.01);
(Continued)

(58) Field of Classification Search
CPC .......... F01D 25/10; F01D 25/18; F01D 25/20; F01D 19/00; F02C 7/06; F02C 7/268; F02C 7/275; F02C 7/09
See application file for complete search history.

(56) References Cited

U.S. PATENT DOCUMENTS

| 7,690,205 B2 | 4/2010 | Delaloye et al. |
| 8,256,576 B2 * | 9/2012 | Glahn ...................... F02C 7/32 184/7.4 |

(Continued)

FOREIGN PATENT DOCUMENTS

FR    2 960 592 B1    2/2016

OTHER PUBLICATIONS

HR International Search Report as issued in International Patent Application No. PCT/FR2021/051241, dated Oct. 22, 2021.

*Primary Examiner* — Kyle Robert Thomas
(74) *Attorney, Agent, or Firm* — Pillsbury Winthrop Shaw Pittman LLP

(57) ABSTRACT

A method for starting an aircraft engine in which the engine is coupled to a lubrication circuit including an oil pump system, the lubrication circuit being constructed and arranged to circulate oil in the engine, and in which an operating mode of the engine includes a stop mode and a standby mode, the starting method including, during a starting phase, measuring an oil temperature, the measurement being performed by a temperature detection device; depending on the temperature measured, compared to a threshold temperature, and depending on the operating mode (Continued)

of the engine, select a starting oil flow profile to be applied in said engine, the selection being performed by a calculator, and applying the selected starting oil flow profile by the oil pump system, the oil pump system being controlled by the calculator.

10 Claims, 4 Drawing Sheets

(51) Int. Cl.
    *F01D 25/10*     (2006.01)
    *F01D 25/18*     (2006.01)
    *F02C 7/06*     (2006.01)
    *F02C 7/26*     (2006.01)
    *F02C 7/268*     (2006.01)
    *F02C 7/275*     (2006.01)

(52) U.S. Cl.
    CPC ................ *F02C 7/06* (2013.01); *F02C 7/26* (2013.01); *F02C 7/268* (2013.01); *F02C 7/275* (2013.01); *F16N 2210/08* (2013.01); *F16N 2270/70* (2013.01)

(56) References Cited

U.S. PATENT DOCUMENTS

| | | | | |
|---|---|---|---|---|
| 8,887,869 | B2* | 11/2014 | Pisseloup | F02C 7/06 184/6.11 |
| 2003/0230274 | A1* | 12/2003 | Williams | F01M 1/02 123/196 R |
| 2007/0084214 | A1* | 4/2007 | Schmidt | F01D 25/18 60/778 |
| 2007/0169997 | A1* | 7/2007 | Delaloye | F04B 49/20 184/6.11 |
| 2007/0246302 | A1* | 10/2007 | Bell | H02P 3/18 60/39.08 |
| 2009/0183950 | A1 | 7/2009 | Brouillet et al. | |
| 2015/0128597 | A1* | 5/2015 | Schlak | F02C 3/08 60/719 |
| 2015/0251766 | A1* | 9/2015 | Atkey | F25B 27/00 60/785 |
| 2015/0330869 | A1* | 11/2015 | Ziarno | G01M 15/14 701/34.4 |
| 2016/0076461 | A1* | 3/2016 | Kawai | B64D 37/30 60/39.463 |
| 2018/0128124 | A1* | 5/2018 | Avis | F01D 25/18 |
| 2018/0187601 | A1 | 7/2018 | Segura Martinez De Ilarduya et al. | |

* cited by examiner

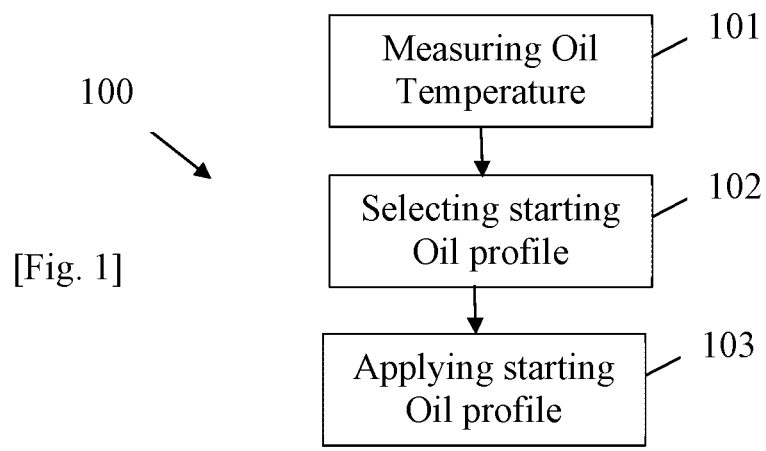
[Fig. 1]
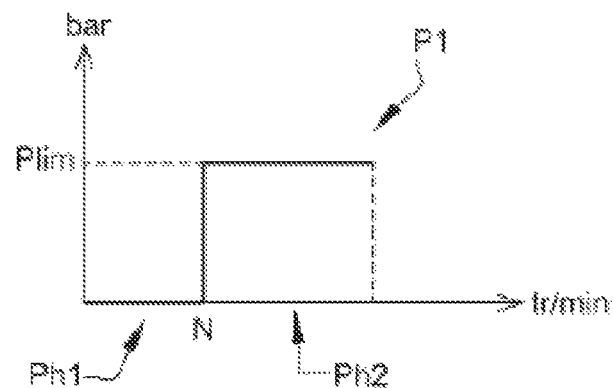
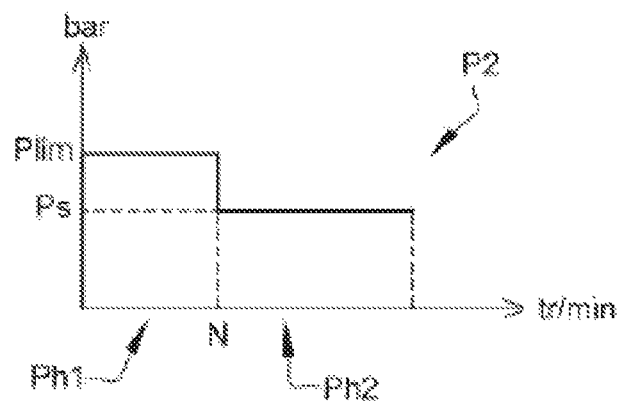

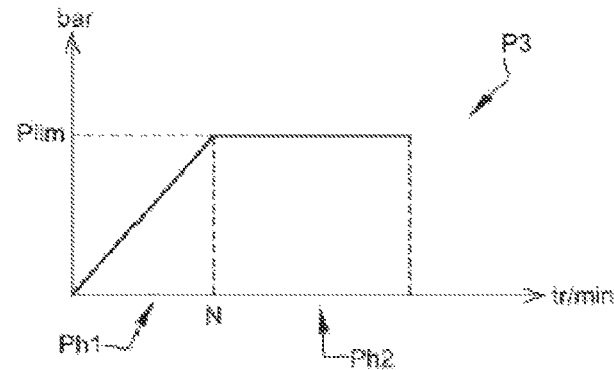
[Fig. 4]
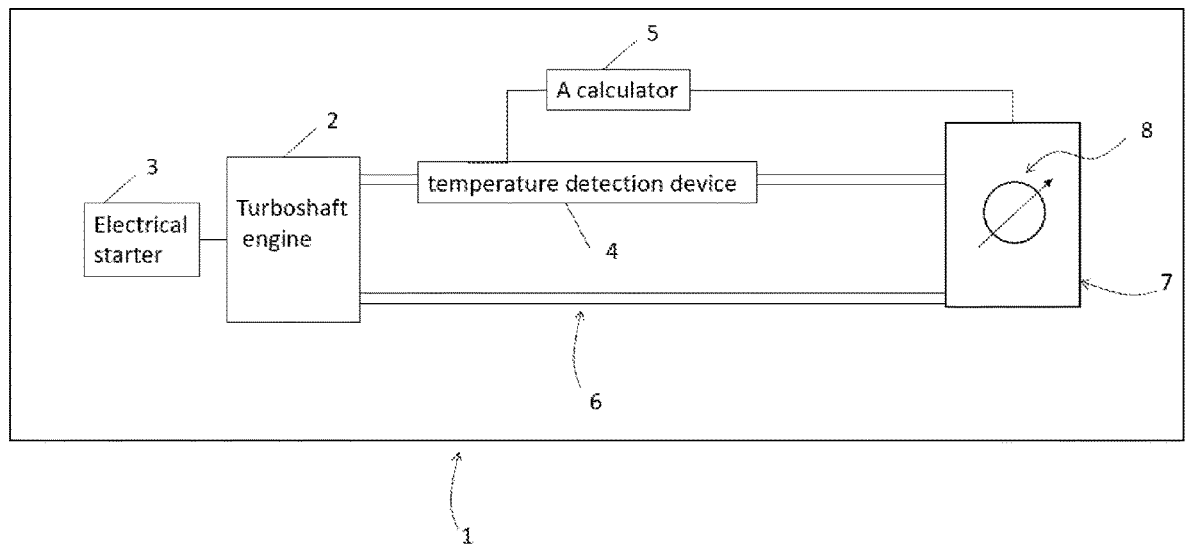
[Fig. 5]

[Fig. 6]
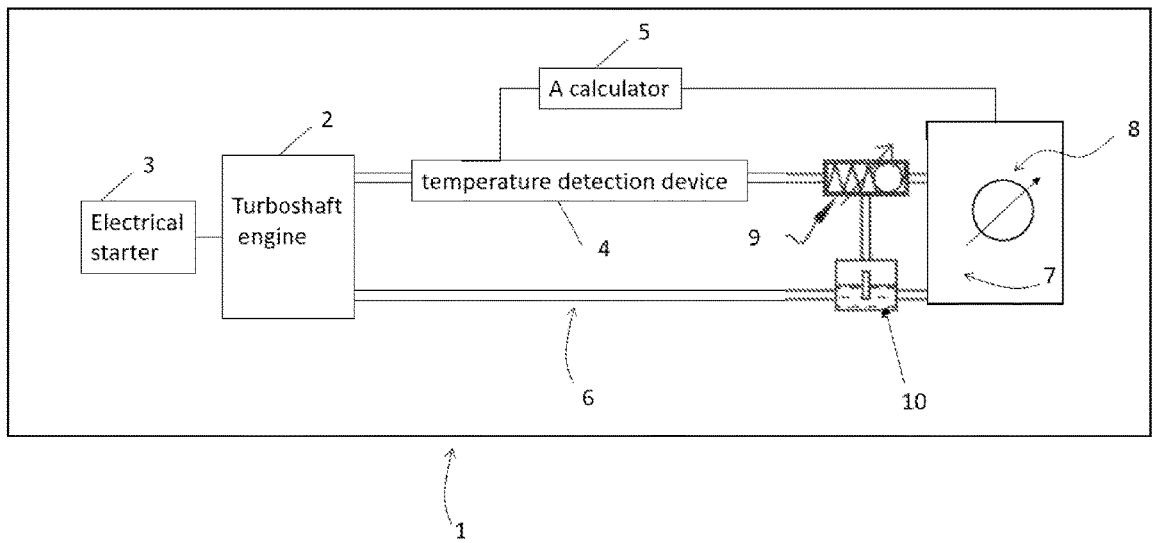
[Fig. 7]
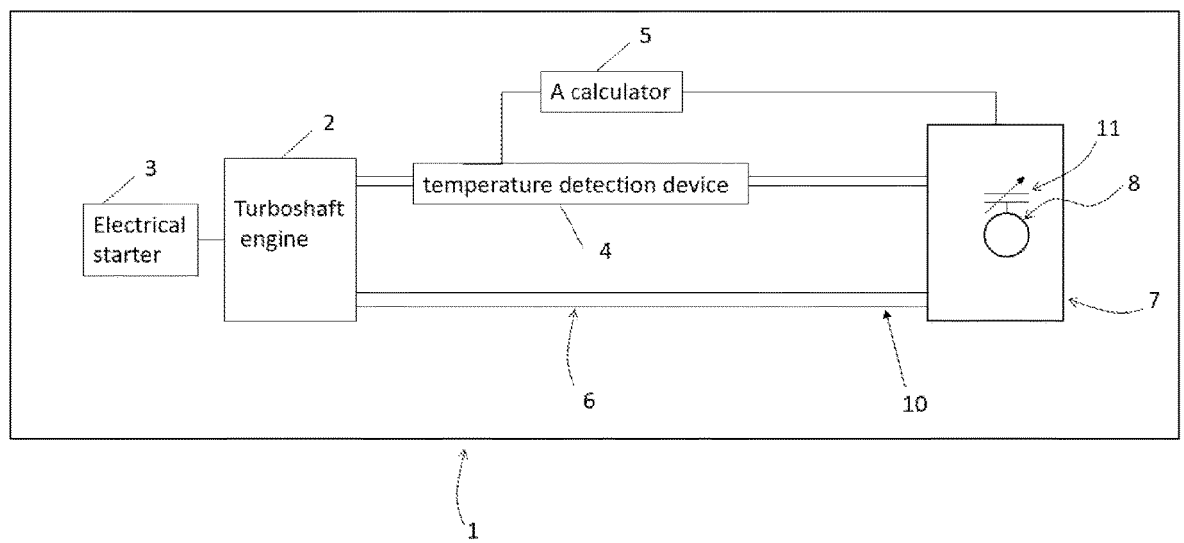

[Fig. 8]
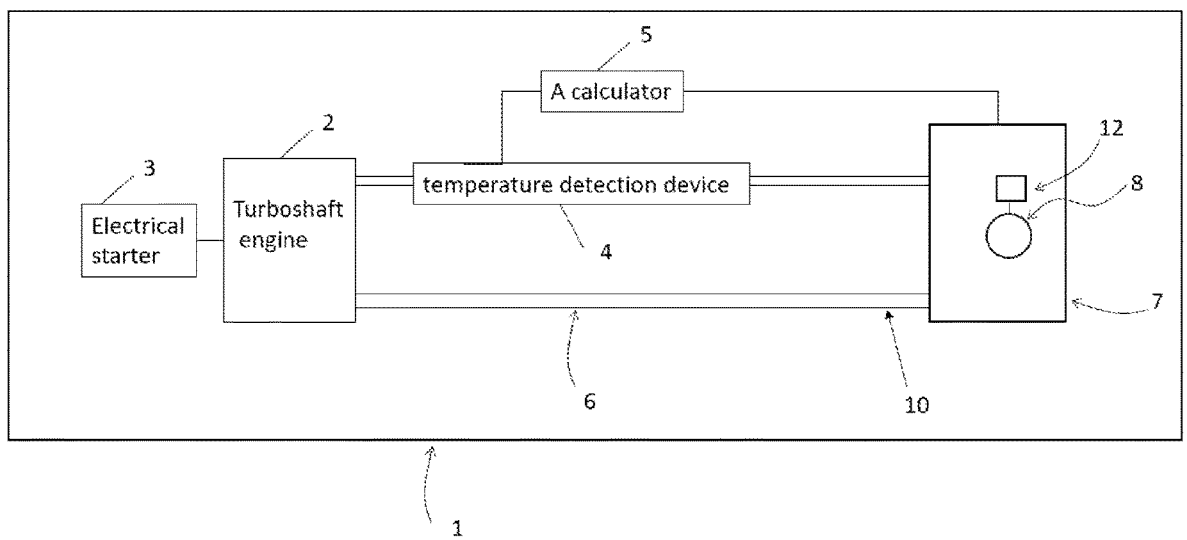
[Fig. 9]
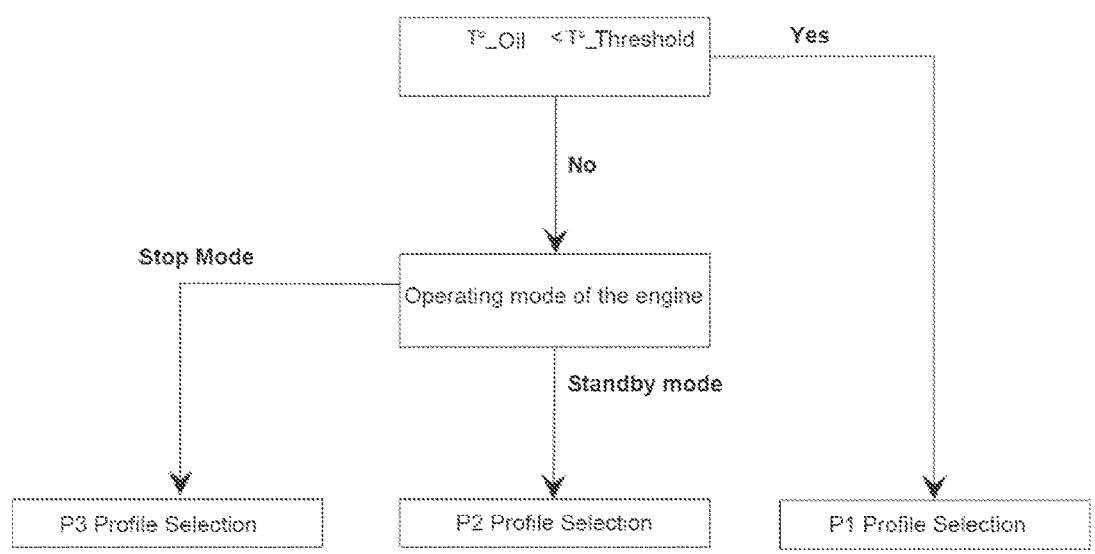

METHOD FOR STARTING AN AIRCRAFT ENGINE

CROSS-REFERENCE TO RELATED APPLICATIONS

This application is the U.S. National Stage of PCT/FR2021/051241, filed Jul. 6, 2021, which in turn claims priority to French patent application number 2007261, filed Jul. 9, 2020. The content of these applications are incorporated herein by reference in their entireties.

TECHNICAL FIELD OF THE INVENTION

The invention concerns the starting of an aircraft engine, such as a gas turbine for a turboshaft engine or a turbogenerator. The field of application of the invention is more particularly that of light flying machines, especially helicopters.

TECHNOLOGICAL BACKGROUND OF THE INVENTION

An aircraft engine is usually coupled to an electric starter. To start the engine, the starter is supplied with electric power, for example from a ground power unit or an auxiliary power unit. The starter operates as an electric motor and rotatably drives the engine.

It is known that the viscosity of an engine's lubricating oil increases as the temperature drops. Thus, in extreme cold conditions, for example at temperatures below −40° C., the oil has a high viscosity, which results in a high engine starting torque. Tests have shown that most of the absolute level of resistive torque is generated by the oil pump. This is because the oil pump has to convey and pressurise an extremely viscous oil, which leads to significant losses, which can amount to up to 80% of the load torque provided by the gas turbine itself as well as its equipment.

The starter can be dimensioned to provide a torque corresponding to the engine starting torque in extreme cold conditions. However, this torque is significantly higher than the starting torque at higher temperatures. Thus, starting in extreme cold conditions means that the starter and its power electronics have to be overdimensioned, leading to significant mass and space requirements. In addition, the ground power unit has to be able to provide the high power required for starting.

A method for starting an aircraft engine is known from FR-B1-2960592, which consists in preheating the oil before starting the engine by means of a starter. In particular, if the temperature measured is below a certain temperature threshold, e.g. −15° C., icing conditions are signalled by illuminating a warning light on the instrument panel. This indicates to the pilot that preheating of the engine oil is required. The pilot can then generate a preheat command to control the starter to rotatably drive the engine at a low speed. For example, the engine is driven at a speed that is between 8% and 12% of its windmill speed. Thus, the torque required from the starter is controlled. Due to the heat loss from the starter, the oil temperature increases gradually. Heat losses in the bearings of the motor casings and, to a lesser extent, in the gearbox, also contribute to the increase in oil temperature. Thus, the motor resistive torque gradually decreases. This step, during which the motor is driven at low speed, is therefore a preheating step for the oil, which can last for example between 8 and 10 minutes.

Even if the oil pressure is reduced due to the low engine rotation, it is still present, causes significant losses and requires the use of an overdimensioned starter. Furthermore, this implementation optimises starting only in cold weather.

Furthermore, such a solution of preheating the oil to reduce its viscosity, and therefore mechanical losses, is not suitable for helicopters. Indeed, during certain specific interventions, for example a rescue operation in the mountains at negative temperatures, the pilot does not have the time necessary to preheat oil before starting the engine.

SUMMARY OF THE INVENTION

The invention provides a technical solution to the above technical problems by allowing an aircraft engine to be started under optimal conditions regardless of the oil temperature and furthermore allows an aircraft to be equipped with a non-overdimensioned starter.

In this context, one aspect of the invention thus relates, in its broadest acceptance, to a method for starting an aircraft engine, wherein said engine is coupled to a lubrication circuit comprising notably an oil pump system, said lubrication circuit being constructed and arranged to circulate oil in said engine, and wherein an operating mode of the engine comprises a stop mode and a standby mode, said starting method being characterised in that it comprises, during a starting phase, the steps of:

measuring an oil temperature, said measurement step being performed by a temperature detection device;

depending on said temperature measured, compared to a threshold temperature, and depending on the operating mode of said engine, selecting a starting oil flow profile to be applied in said engine, said selection step being performed by a calculator;

applying said selected starting oil flow profile by means of said oil pump system, said oil pump system being controlled by said calculator.

With the method for starting an aircraft engine according to this aspect of the invention, it is possible, during start-up, to select an oil flow profile depending on the oil temperature. For example, if the oil temperature is low, it is possible to select a zero oil flow rate for a short period of time in order to eliminate losses caused by oil displaced by the oil pump system. A short period of time is defined as a period of time that is less than the nominal start-up time (for the temperature in question) and that does not degrade the overall mechanical reliability. A short period of time can for example be less than 10 seconds.

These characteristics make it possible to avoid equipping aircraft, especially helicopters, with an overdimensioned starter. On the other hand, when the oil temperature is high, it is possible to select a high oil flow rate in order to provide maximum lubrication to, for example, the oil bearings during the starting phase. In addition to the characteristics just discussed in the preceding paragraph, the method for starting an aircraft engine according to this aspect of the invention may have one or more of the following additional characteristics, considered individually or in any technically possible combination.

According to one aspect of the invention, each oil flow profile comprises a first phase and a second phase, said second phase corresponding to a predetermined oil pressure at the engine inlet, applied when the engine speed reaches a threshold speed value.

According to one aspect of the invention, if the oil temperature measured is below the threshold temperature and if the engine operating mode is stop mode, the oil flow profile comprises:
- a first phase during which the oil pressure at the engine inlet is zero until the engine speed reaches a threshold speed;
- a second phase during which the oil pressure at the engine inlet is equal to a limit oil pressure value.

According to one aspect of the invention, if the oil temperature measured is above the threshold temperature and if the engine operating mode is the standby mode, the oil flow profile comprises:
- a first phase during which the oil pressure at the engine inlet is equal to a limit oil pressure value until the engine speed reaches a threshold speed;
- a second phase during which the oil pressure at the engine inlet is equal to a threshold oil pressure value, said threshold oil pressure value being lower than said limit oil pressure value.

According to one aspect of the invention, if the oil temperature is above the threshold temperature and if the engine operating mode is stop mode, the oil flow profile comprises:
- a first phase during which the oil pressure at the engine inlet is increased until the engine speed reaches a threshold speed;
- a second phase during which the oil pressure at the engine inlet is equal to a limit oil pressure value.

Another aspect of the invention relates to an aircraft comprising:
- an engine with an operating mode that includes a stop mode and a standby mode; and
- a temperature detection device constructed and arranged to measure an oil temperature;

said aircraft implementing the above method and comprising:
- a calculator constructed and arranged to select, as a function of said temperature measured, a starting oil flow profile to be applied in said engine;
- a lubrication circuit including an oil pump system, said oil pump system being constructed and arranged to apply said selected starting oil flow profile.

In one aspect of the invention, the oil pump system comprises a variable displacement oil pump.

According to one aspect of the invention, the oil pump system comprises an oil pump and an electro-valve, said electro-valve being located downstream of said oil pump and being constructed and arranged to redirect all or part of the oil flow from said oil pump into a tank.

In one aspect of the invention, the oil pump system comprises an oil pump and a mechanical decoupling device constructed and arranged to activate or deactivate rotation of the oil pump.

In one aspect of the invention, the oil pump system comprises an oil pump rotatably driven by a rotating electric machine.

The invention and its various applications will be better understood upon reading the following description and upon examining the accompanying figures.

BRIEF DESCRIPTION OF THE FIGURES

The figures are set forth by way of indicating and in no way limiting purposes for the invention.

FIG. 1 schematically illustrates a method for starting an aircraft engine according to one aspect of the invention.

FIG. 2 schematically illustrates a first example of an oil flow profile according to one aspect of the invention.

FIG. 3 schematically illustrates a second example of an oil flow profile according to one aspect of the invention.

FIG. 4 schematically illustrates a third example of an oil flow profile according to one aspect of the invention.

FIG. 5 schematically illustrates an aircraft engine according to a first aspect of the invention.

FIG. 6 schematically illustrates an aircraft engine according to a second aspect of the invention.

FIG. 7 schematically illustrates an aircraft engine according to a third aspect of the invention.

FIG. 8 schematically illustrates an aircraft engine according to a fourth aspect of the invention.

FIG. 9 is a flow chart illustrating the selection of the oil flow profile according to the oil temperature and the engine operating mode.

DETAILED DESCRIPTION

Unless otherwise specified, a same element appearing in different figures has a single reference.

FIG. 1 illustrates a method 100 for starting an aircraft engine in accordance with an aspect of the invention. The engine, or turboshaft engine, is coupled to a lubrication circuit including an oil pump system, the lubrication circuit being constructed and arranged to circulate oil through the engine.

When the aircraft is on the ground and the engine is stopped or in standby, the starting method 100 comprises a step 101 of measuring an oil temperature, the step 101 of measuring being performed by a temperature detection device, for example a temperature sensor.

Depending on the temperature measured in step 101, the starting method 100 comprises a step 102 of selecting a starting oil flow profile to be applied in the engine, the selection step 102 being performed by a calculator. The selection step 102 is carried out as a function, on the one hand, of the oil temperature measured and, on the other hand, of an engine operating mode. The selection according to the oil temperature measured is made by comparison with a threshold temperature. The engine operating mode can be a standby mode or a stop mode.

For example, when the aircraft is on the ground, the engine is stopped and the temperature sensor detects an oil temperature below a certain temperature threshold, e.g. −15° C., a starting oil flow profile corresponding to extreme cold conditions is selected.

FIG. 2 shows an example of an oil flow profile P1 suitable for extreme cold conditions. Extreme cold" is defined as conditions where the oil temperature of the engine is below the threshold temperature, the oil temperature being a result of the operating mode of the engine. This profile P1 is selected in step 102 of selecting an oil flow profile if the oil temperature measured is below the threshold temperature and if the engine operating mode is in the stop mode. The oil flow profile P1 can be selected when the oil temperature is below −15° C.

In FIG. 2, as in FIGS. 3 and 4, the y-axis shows the oil pressure and the x-axis shows the engine speed.

In this case, the oil flow profile P1 comprises a first phase Ph1 in which the oil pressure at the engine inlet is zero until the engine speed reaches a threshold speed N. Considering a nominal speed of 100%, the threshold speed N can for example be equal to 10-50% of the nominal speed At the end of the first phase Ph1, the oil flow profile P1 includes a second phase Ph2 during which the oil pressure at the engine inlet is equal to a limit pressure value Plim. This limit pressure Plim may be, for example, in the order of 5 bar.

In order to achieve zero oil pressure at the engine inlet, it is possible to control different types of oil pump systems.

To this end, the starting method 100 comprises a step 103 of applying the selected starting oil flow profile by means of the oil pump system, the oil pump system being controlled by the calculator.

According to one aspect of the invention, the selected starting oil flow profile is applied by means of an oil pump system comprising a variable displacement oil pump. Such a variable displacement oil pump allows the output flow of the oil pump system to be adjusted or even cancelled by displacement through a controlled actuator for reducing eccentricity of the pump rotor with respect to the pump stator. Such technology is known as a vane pump.

Thus, it is possible to apply a zero oil flow in the lubrication circuit and consequently eliminate significant losses generated by viscous oil, which can represent up to 80% of the resisting torque provided by the engine itself and its equipment.

According to another aspect of the invention, the selected starting oil flow profile is applied by means of an oil pump system comprising an oil pump, an electric valve and a tank. The electro-valve is located downstream of the oil pump and is constructed and arranged to redirect all or part of the oil flow from the oil pump into the tank without the oil being pressurised.

According to another aspect of the invention, the selected starting oil flow profile is applied by means of an oil pump system comprising an oil pump and a mechanical decoupling means constructed and arranged to activate or deactivate rotation of the oil pump. This mechanical decoupling means may be, for example, a clutch or a clutch for activating or deactivating the rotation of the oil pump.

FIG. 3 illustrates an example of an oil flow profile P2 suitable for high temperatures and standby operation of the engine. High temperatures are defined as oil temperatures above the threshold temperature resulting from the engine operating mode. The profile P2 is selected in the step 102 of selecting an oil flow profile if the oil temperature measured is above the threshold temperature and the engine operating mode is in standby mode.

The engine standby mode is characterised by low engine speed. A high oil pressure allows for a long period of time of operation in the so-called vibration-critical speed ranges (usually between 10 and 30% of the rated speed of the engine). During this phase of operation, it is possible to adapt the profile for other functions, such as favouring the pressure for damping of vibration modes.

The oil damping devices fitted to the shaft lines of the turboshaft engine require a minimum level of oil pressure. Thanks to the invention, in order to optimise the vibration behaviour during an engine standby operating phase, a pressure higher than the nominal is preferred. Once this operating phase is over, it is possible to supply these damping devices with a lower pressure.

This type of P2 oil flow profile is also suitable for positive displacement pumps, where the oil flow is dictated by the engine speed.

In this case, the oil flow profile P2 selected in step 102 comprises a first phase Ph1 during which the oil flow pressure is equal to a limit oil pressure value Plim until the engine speed reaches a threshold speed N. During this phase, the oil supply to the damping systems can be optimised.

After the first phase Ph1, the oil flow profile P2 comprises a second phase Ph2 in which the oil pressure is equal to a threshold oil pressure value Ps. The threshold oil pressure value Ps is lower than the limit oil pressure value Plim. This threshold pressure Ps can be, for example, in the order of 3 bar.

In other words, this oil flow profile P2 is chosen when the engine is in standby mode and not completely stopped. The turboshaft engine is in a standby state for example in one of the following two cases:
  The combustion chamber is switched off and the turboshaft engine is driven at low speed: the oil pump then operates at a given operating point, characterised by the pressure plateau of the phase Ph1 of the profile P2;
  The combustion chamber is ignited and the turbo-shaft engine has a low speed position, which can be autonomous or electrically assisted: the oil pump then operates on a given operating point, characterised by the pressure plateau of the phase Ph1 of the profile P2.

In both cases, if a restart of the turboshaft engine initially in its standby mode is required, the operating point of the oil pump will move along the pressure plateau of phase Ph1 up to the threshold speed N and then position itself on the pressure plateau of phase Ph2 which is a regulated and determined pressure plateau. During the phase Ph1, the power supply to the damping elements is adequate and the cooling of the so-called critical hot zones is improved because, in standby mode, the chamber can be switched on or very recently switched off (thermal transient present). At the end of the start-up, i.e. when the speed N becomes higher than a threshold speed, the oil pressure passes on a sufficient pressure plateau Ps.

In other words, this oil flow profile P2 makes it possible, for example, to actively supply certain critical engine components with oil from the beginning of the start-up phase in order to ensure optimal operation. It also allows the oil requirement to be adjusted in a second phase of the engine's standby mode.

The selected oil flow profile P2 is then applied in step 103 using the oil pump system.

Like the oil flow profile P1, the oil flow profile P2 can be applied by means of the oil pump system with a variable displacement oil pump.

Similarly, the selected starting oil flow profile P2 can be applied by means of an oil pump system comprising an oil pump, an electric valve and a tank. The electro-valve is located downstream of the oil pump and is constructed and arranged to redirect all or part of the oil flow from the oil pump into the tank while controlling the target engine inlet pressure level from zero to a predefined value.

In a different implementation, the selected starting oil flow profile P2 can be applied by means of an oil pump system comprising an oil pump and a rotating electric machine constructed and arranged to assist the oil pump in rotation. This auxiliary electric machine is fully controllable by the calculator in torque and speed as required.

FIG. 4 illustrates an example of an oil flow profile P3 that maintains optimum engine performance while not requiring an overdimensioned starter. The oil flow profile P3 is selected in the oil flow profile selection step 102 if the oil temperature measured is above the threshold temperature and if the engine operating mode is off.

In this case, the oil flow profile P3 comprises a first phase Ph1 in which the oil pressure is increased until the engine speed reaches a threshold speed N.

After the first phase Ph1, the oil flow profile P3 comprises a second phase Ph2 in which the oil pressure at the engine inlet is equal to a limit oil pressure value Plim.

The selected oil flow profile P3 is then applied in step 103 using the oil pump system.

Like the oil flow profile P1, the oil flow profile P3 can be applied by means of the oil pump system comprising:
- a variable displacement oil pump, or
- oil pump, electro-valve and tank.

In addition, the oil flow profile P3 can be applied by means of the oil pump system comprising an oil pump and a rotating electric machine constructed and arranged to rotatably assist the oil pump.

FIG. 9 is a flow chart illustrating the step 102 of selecting the oil flow profile P1, P2, P3 as a function of:
- the oil temperature in relation to the threshold temperature, and
- the operating mode of the engine.

If the oil temperature is below the threshold temperature, then the engine is in stop mode and profile P1 is selected. If the oil temperature is above the threshold temperature, then the selected oil flow profile will be either oil flow profile P2 or oil flow profile P3. Oil flow profile P2 is selected if the engine is in standby mode. P3 is selected if the engine is in stop mode.

FIG. 5 illustrates an aircraft according to a first aspect of the invention. The aircraft 1 comprises a turboshaft engine 2 mechanically coupled to an electric starter 3. The aircraft 1 includes:
- a temperature detection device 4 constructed and arranged to measure an oil temperature;
- a calculator 5 constructed and arranged to select a starting oil flow profile to be applied in the engine 2, depending on the temperature measured;
- a lubrication circuit 6 including an oil pump system 7, the oil pump system 7 being constructed and arranged to apply the selected starting oil flow profile.

In the example illustrated in FIG. 5, the oil pump system 7 comprises a variable displacement oil pump 8 mechanically driven by the turboshaft engine 2 via an accessory gearbox not shown.

In the example illustrated in FIG. 6, the oil pump system 7 comprises an oil pump 8 which is mechanically driven by the turboshaft engine 2 via an accessory gearbox not shown, an electro-valve 9 and a tank 10. The electro-valve 9 is located downstream of the oil pump 8 and is constructed and arranged to redirect all or part of the oil flow from the oil pump 8 into the tank 10.

In the example illustrated in FIG. 7, the oil pump system 7 comprises an oil pump 8 which is mechanically driven by the turboshaft engine 2 via an accessory gearbox not shown, and a mechanical decoupling device 11. The oil pump 8 is associated with the mechanical decoupling device 11 which is constructed and arranged to activate or deactivate rotation of the oil pump 8.

In the example illustrated in FIG. 8, the oil pump system 7 comprises an oil pump 8 and a rotating electric machine 12. The oil pump 8 is therefore rotatably assisted by the rotating electric machine 12.

Of course, the aspects of the invention set forth above are not limiting. It is, for example, obvious that the person skilled in the art is able to provide different oil flow profiles and different oil pump systems constructed and arranged to apply different oil flow profiles.

The invention claimed is:

1. A method for starting an aircraft engine, wherein said aircraft engine is coupled to a lubrication circuit comprising an oil pump system, said lubrication circuit being constructed and arranged to circulate oil which is passed to a supply line to be supplied to oil damping devices of the said aircraft engine, and wherein an operating mode of the aircraft engine comprises a stop mode and a standby mode characterised by low engine speed, said method for starting comprising, during a starting phase:
    measuring an oil temperature, by a temperature detection device;
    depending on said oil temperature measured, compared to a threshold temperature, and depending on the operating mode of said aircraft engine, selecting a starting oil flow profile from among a plurality of starting oil flow profiles, to be applied in said aircraft engine, said selection being performed by a calculator;
    applying said starting oil flow profile selected by said oil pump system, said oil pump system being controlled by said calculator; and
    circulating oil at pressure higher than a nominal value pressure in the oil damping devices in response to the oil temperature being measured above the threshold temperature and the engine operating mode being in standby mode, the oil dampening devices being fitted to the shaft lines of the turboshaft engine, and in response to this engine standby mode being over, supplying oil to the oil damping devices with a lower pressure than the pressure higher than the nominal value pressure.

2. The method for starting an aircraft engine according to claim 1, wherein each oil flow profile comprises a first phase and a second phase, said second phase corresponding to a predetermined oil pressure at an aircraft engine inlet, applied when an aircraft engine speed reaches a threshold speed value.

3. The method for starting an aircraft engine according to claim 1, further comprising responsive to the oil temperature being measured below the threshold temperature and the operating mode of the aircraft engine being the stop mode, the oil flow profile comprises:
    a first phase during which an oil pressure at an aircraft engine inlet is zero until an aircraft engine speed reaches a threshold speed;
    a second phase during which the oil pressure at the aircraft engine inlet is equal to a limit oil pressure value.

4. The method for starting an aircraft engine according to claim 1, wherein the oil flow profile comprises:
    a first phase during which an oil pressure at an aircraft engine inlet is equal to a limit oil pressure value until an aircraft speed of the aircraft engine reaches a threshold speed;
    a second phase during which the oil pressure at the aircraft engine inlet is equal to a threshold oil pressure value, said threshold oil pressure value being lower than said limit oil pressure value.

5. The method for starting an aircraft engine according to claim 1, further comprising responsive to the oil temperature being measured higher than the threshold temperature and the operating mode of the aircraft engine being the stop mode, the oil flow profile comprises:
    a first phase during which an oil pressure at an aircraft engine inlet is increasing until the aircraft engine speed reaches a threshold speed;
    a second phase during which the oil pressure at the aircraft engine inlet is equal to a limit oil pressure value.

6. An aircraft comprising an aircraft engine whose operating mode includes a stop mode and a standby mode and a temperature detection device constructed and arranged to measure an oil temperature, said aircraft being adapted to implement the method according to claim 1 and includes:
- the calculator constructed and arranged to, depending on said temperature measured, select the starting oil flow profile to be applied in said aircraft engine;
- the lubrication circuit including the oil pump system, said oil pump system being constructed and arranged to apply said starting oil flow profile selected.

7. The aircraft according to claim 6, wherein the oil pump system comprises a variable displacement oil pump.

8. The aircraft according to claim 6, wherein the oil pump system comprises an oil pump and an electro-valve, said electro-valve being located downstream of said oil pump and being constructed and arranged to redirect all or part of the oil flow out of said oil pump into a tank.

9. The aircraft according to claim 6, wherein the oil pump system comprises an oil pump and a mechanical decoupling device constructed and arranged to activate or deactivate rotation of the oil pump.

10. The aircraft according to claim 6, wherein the oil pump system comprises an oil pump rotatably assisted by a rotating electric machine.

* * * * *